(12) United States Patent
Thrasher et al.

(10) Patent No.: US 8,838,793 B1
(45) Date of Patent: Sep. 16, 2014

(54) METHOD AND APPARATUS FOR PROVISIONING STORAGE TO A FILE SYSTEM

(75) Inventors: Russell Thrasher, Graham, NC (US); Mark Sutter, Chapel Hill, NC (US); Jason Taylor, Apex, NC (US); Abhijit Muthiyan, Cary, NC (US); Athiya Ansari, Raleigh, NC (US)

(73) Assignee: Symantec Operating Corporation, Mountain View, CA (US)

( * ) Notice: Subject to any disclaimer, the term of this patent is extended or adjusted under 35 U.S.C. 154(b) by 1913 days.

(21) Appl. No.: 10/411,004

(22) Filed: Apr. 10, 2003

(51) Int. Cl.
*G06F 15/177* (2006.01)
(52) U.S. Cl.
USPC ........... 709/226; 709/223; 709/224; 718/104; 718/105; 718/102
(58) Field of Classification Search
USPC ........... 709/224, 223, 226; 718/104, 105, 102
See application file for complete search history.

(56) References Cited

U.S. PATENT DOCUMENTS

| | | | | |
|---|---|---|---|---|
| 6,920,494 B2 * | 7/2005 | Heitman et al. | | 709/223 |
| 6,985,956 B2 * | 1/2006 | Luke et al. | | 709/229 |
| 7,133,907 B2 * | 11/2006 | Carlson et al. | | 709/220 |
| 7,137,124 B2 * | 11/2006 | Lamb et al. | | 719/321 |
| 7,194,538 B1 * | 3/2007 | Rabe et al. | | 709/224 |
| 7,313,614 B2 * | 12/2007 | Considine et al. | | 709/223 |
| 7,403,987 B1 * | 7/2008 | Marinelli et al. | | 709/223 |
| 7,685,261 B1 * | 3/2010 | Marinelli et al. | | 709/220 |
| 7,685,269 B1 * | 3/2010 | Thrasher et al. | | 709/224 |
| 7,886,031 B1 * | 2/2011 | Taylor et al. | | 709/221 |
| 8,180,872 B1 * | 5/2012 | Marinelli et al. | | 709/223 |
| 2002/0156887 A1 * | 10/2002 | Hashimoto | | 709/224 |
| 2003/0033346 A1 * | 2/2003 | Carlson et al. | | 709/104 |
| 2003/0033398 A1 * | 2/2003 | Carlson et al. | | 709/223 |
| 2003/0093501 A1 * | 5/2003 | Carlson et al. | | 709/220 |
| 2003/0135609 A1 * | 7/2003 | Carlson et al. | | 709/224 |
| 2003/0149763 A1 * | 8/2003 | Heitman et al. | | 709/224 |
| 2004/0088400 A1 * | 5/2004 | Daggett | | 709/224 |

* cited by examiner

*Primary Examiner* — Kenneth Coulter
(74) *Attorney, Agent, or Firm* — Campbell Stephenson LLP

(57) ABSTRACT

A storage area network (SAN), which includes one or more remote systems, a plurality of storage devices, a SAN fabric comprising a plurality of fabric components for coupling the remote systems to the storage devices, and a central system having a SAN management server configured to monitor an amount of available storage in a file system used in the remote systems, and automatically provision additional storage to the file system in the event the amount of available storage in the file system decreases below a predetermined amount.

23 Claims, 3 Drawing Sheets

METHOD AND APPARATUS FOR PROVISIONING STORAGE TO A FILE SYSTEM

BACKGROUND OF THE INVENTION

1. Field of the Invention

Embodiments of the present invention generally relate to storage management, and more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly in the network, where disk accesses may be made directly rather than through the server's SCSI connection. This network-attached storage (NAS) model eliminates SCSI's restrictive cable distance, signal timing, and termination requirements. However, this model adds a significant load to the network, which frequently is already starved for bandwidth. Gigabit Ethernet technology only alleviates this bottleneck for the short term, and thus, a more elegant solution is desirable.

The storage area network (SAN) model places storage on its own dedicated network, removing data storage from both the server-to-disk SCSI bus and the main user network. This dedicated network most commonly uses Fiber Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fiber Channel switching technology to a wide range of servers and storage devices. The versatility of the SAN model enables organizations to perform tasks that were previously difficult to implement, such as LAN-free and server-free tape backup, storage leasing, and full-motion video services.

As SANs continue to proliferate and grow, more and more users are requiring automated storage resource management capabilities in SAN management products. Therefore, a need exists for a method and apparatus that automatically manages storage in a SAN environment.

SUMMARY OF THE INVENTION

Embodiments of the present invention are generally directed to a storage area network (SAN), which includes one or more remote systems, a plurality of storage devices, a SAN fabric comprising a plurality of fabric components for coupling the remote systems to the storage devices, and a central system having a SAN management server configured to monitor an amount of available storage in a file system used in the remote systems, and automatically provision additional storage to the file system in the event the amount of available storage in the file system decreases below a predetermined amount.

Embodiments of the invention are also directed to a method of provisioning storage to a file system. The method includes determining an amount of available storage in the file system, determining whether the amount of available storage decreases below a predetermined amount, and if the amount of the available storage decreases below the predetermined amount, provisioning the file system with additional available storage having a quality of service that matches a quality of service of the storage used by the file system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
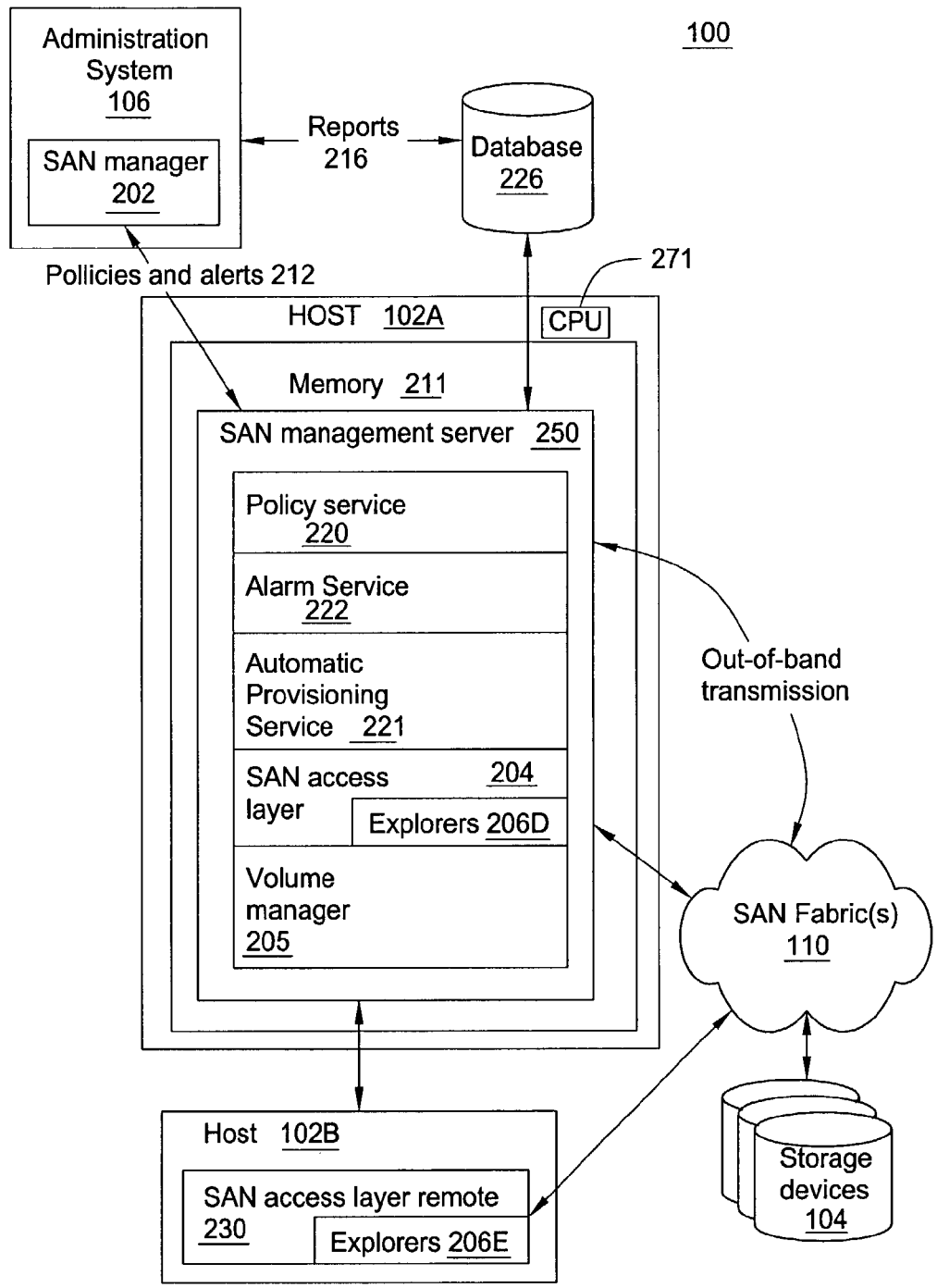
FIG. 1 illustrates an exemplary storage area network (SAN) in accordance with one embodiment of the invention.

FIG. 1 illustrates an exemplary storage area network (SAN) 100 in accordance with one embodiment of the invention. Although a SAN is illustrated, other network based storage configuration may be contemplated with embodiments of the invention. The SAN 100 is generally based on a distributed client-server architecture. The SAN 100 includes host 102A having a SAN management server 250 stored therein. The SAN management server 250 is communicably linked to a SAN administration system 106 having a SAN manager 202 stored therein, a central database 226 and host 102B. The SAN management server 250 is also communicably linked to a plurality of storage devices 104 through one or more SAN fabrics 110. The aforementioned components will now be described in greater details.

The SAN 100 is generally a high-speed, special-purpose network that interconnects storage devices 104 with associated data servers, e.g., hosts 102A and 102B on behalf of a larger network of users. The SAN 100 may employ Fiber Channel technology. One or more end-user platforms (not shown) may access the SAN 100, typically via a LAN or WAN connection to one or more of the hosts 102A or 102B.

Host 102A may be referred to as a central system, while host 102B may be referred to as a remote system. Although only hosts 102A & 102B are shown in FIG. 1, embodiments of the invention contemplate a plurality of hosts or remote servers communicably linked to host 102A. Each host includes at least one processor, e.g., CPU 271, which is electrically connected to a memory 211. Memory 211 may comprise random access memory, read only memory, removable disk memory, flash memory, and various combinations of these types of memory. Memory 211 is sometimes referred to as main memory and may in part be used as cache memory or buffer memory. Memory 211 may store various software packages, such as an automatic provisioning service 221.

Hosts 102A & 102B may run on any of a variety of operating systems, including Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the SAN fabric 110 via one or more Host Bus Adapters (HBAs). The SAN fabric 110 may enable server-to-storage device connectivity through Fiber Channel switching technology and may include one or more switches, bridges, hubs, or other devices, such as routers, as well as the interconnecting cables (e.g., for Fiber Channel SANs, fiber optic cables). Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices.

The SAN management server 250 is generally configured to discover SAN objects, such as hosts, HBAs, switches and storage devices, to maintain a data store of real-time object information, to manage SAN resources through zoning and LUN access control, to monitor conditions on the SAN, and to perform policy-based actions in response to SAN conditions, to support user-defined and automatic grouping of objects based on quality of service (QoS) criteria, and to make data available to client applications, including the SAN manager 202. The SAN management server 250 may run on a variety of operating systems including, but not limited to Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions).

The SAN management server 250 includes a policy service 220, a monitoring service 222, an automatic provisioning service 221, a SAN access layer 204 and a volume manager 205. The policy service 220 is generally configured to manage policies associated with objects in the SAN 100. Policies are generally defined as rules used to help manage a SAN by automating responses to certain events and conditions. Policies are used to detect when something goes wrong, and to anticipate and handle problems before they occur. A policy indicates a particular object or type of object to monitor. In general, any object for which at least one attribute is provided may be monitored. Objects that may be monitored include, but are not limited to, file systems, volumes, disks, LUNs, groups of objects, applications, SAN fabrics 110, switches, switch ports, hosts, storage groups and other storage configurations. In one embodiment, the policy service 220 is configured to monitor the amount of available storage in a file system of interest to the user. A policy generally includes a description of a condition to monitor on an object, such as the percentage of available storage in a file system, and a set of actions to take when that condition is met. A policy may also include one or more actions to be taken when the condition is detected.

The policy service 220 may be integrated with the SAN manager 202, permitting users to view what policies are in effect on their SAN, to define and modify policies, and to generate inventory and performance reports based on the conditions monitored by the policy service 220. The SAN manager 202 may include a policy utility to facilitate policy creation and maintenance. The policy utility is configured to lead a user through the steps of providing the information described above to create user-defined policies. The user may use the policy utility to make changes in predefined or user-defined policies as desired.

The policy service 220 may also include a policy engine that performs the instructions described in all policies enabled in the SAN. In one embodiment, the policy engine may be a component or process of policy service 220. When the objects in the SAN are discovered, attributes corresponding to the objects may be determined and the relevant attributes may be registered with the policy engine. The policy engine may then receive a stream or streams of real-time attribute data and compare data values with the conditions described in its policies. When the alarm condition for a particular policy is met, the policy engine performs the actions described in the policy.

The conditions available for a policy are determined by the type of object being monitored. Different types of policy conditions may result in different types of alarms. The SAN management server 250 may manage different types of conditions for various objects. One type of policy is a threshold condition with policy action which may be used to monitor an object and detect when a particular numeric threshold is reached and sustained for a configurable period. Another type of policy is a text comparison condition with action policy that may be used to evaluate a textual state to determine the status or condition of the resource.

Each policy may be configured to trigger one or more policy actions when a specified condition is detected. Policy actions typically perform corrective and/or notification functions. One type of policy action is sending a console alert to the SAN manager 202 or a specific hardware alert to the applications that will be affected by the detected condition. The desired level of severity associated with the action may be configurable. Another type of policy action is a command or script (e.g., a PERL script) that executes a command or executable file specified for the action. Yet another type of policy action is to send an e-mail notification or Instant Messaging to one or more specified recipients. In one embodiment, one type of policy action is to trigger the automatic provisioning service 221, which will be discussed in detail in the following paragraphs.

An alarm is a signal that is generated by a policy when the condition specified in the policy is detected or evaluated as true. The alarm is triggered if the condition and policy action are configured in the policy. The alarm is an internal signal used by the SAN management system. An alert to the SAN manager 202 is a configurable response that may result from an alarm being triggered. When an alarm is triggered, the alarm may be referred to as active. An alarm may be dynamic, i.e., the alarm may reset itself automatically when the condition monitored by the policy returns to a specified "clear state." The clear state for a condition may be specified either manually or automatically, depending on whether the condition is a threshold or a textual comparison condition.

The monitoring service 222 is generally configured to monitor and collect status and performance information from the SAN using out-of-band polling (e.g., SNMP polling), traps, SAN access layer 204 events or other management product integration. This attribute information is subsequently fed into the policy service 220 to trigger policy actions and for logging for reporting purposes. In one embodiment, data collected by the monitoring service 222 may be logged in the database 226.

To monitor conditions on a SAN using SNMP traps, some SAN objects send SNMP traps to the SAN management server 250 when an event happens. The SNMP-capable devices in the SAN may be configured to send traps to the host 102A running the SAN management server 250. These traps are generally asynchronous, and thus, the SAN management system cannot poll such an object to determine the current condition. This method is dependent on the trap sender to report when a condition changes by sending additional traps.

Alternatively, objects may be polled directly to determine the current condition. To monitor an object in the SAN 100, the object may include an SNMP agent that is configured to accept SNMP polls and to send SNMP traps.

Another monitoring method may include monitoring object attributes. An attribute or an object attribute is a data value or parameter that represents a characteristic about a specific object. Attributes may be used to monitor object availability, free storage, used storage, total storage, environmental conditions, device errors, SAN traffic, switch port status, dropped frames, disk temperature, and link failures, which are evaluated by the policy service 220 to create an accurate composite status of the SAN. The status of devices is displayed on a topology map of a SAN manager 202 user interface, for example using color-coded icons. Attributes may be based on devices' SNMP MIB variables or data collected from other software applications, utilities, host-based system utilities or other management applications. Each attribute is associated with an object type, such as host 102B or a switch port. Each attribute may also be associated with a type of data, for example textual state or numeric threshold data. Attribute data may be used in real-time attribute graphs, the policy engine, and the SAN reporter, for example.

FIG. 1 further illustrates that the SAN management server 250 includes the SAN access layer 204, which maintains a real-time topology of the SAN 100 by discovering objects in the SAN 100 and the relationship of these objects to each other. In addition, the SAN access layer 204 directly interfaces with switches in the SAN fabrics 110 to manage the zoning of storage resources. In this manner, the SAN access layer 204 discovers additional information about objects in the SAN 100 that SAN management server 250 cannot discover directly, such as devices in a separate zone. The SAN access layer 204 may also automatically discover information for each Addressable Unit (LUN) that is under the control of the volume manager 205.

As shown in FIG. 1, the SAN access layer 204 includes one or more explorers 206D, which are configured to gather information for the SAN access layer 204. Once the information is gathered, the SAN access layer 204 aggregates the gathered information into a SAN access layer 204 data store. Once the SAN 100 is discovered, the SAN access layer 204 periodically examines the SAN 100 for objects that are added, objects that are removed, and connections that are pulled. New explorers 206 may be added as needed or desired. For example, if a new type of SAN device is added to the SAN 100, or an existing type of SAN device is modified or upgraded, an explorer 206 may be added or updated to correctly communicate with the new or updated type of SAN device.

Explorers 206D use different methods to discover information about heterogeneous SAN objects. For example, explorers 206D may query objects in the SAN 100 to retrieve a standard set of attributes for each type of object. The terms "information" and "details" may be used to describe the different kinds of data about a SAN that may be discovered, including SAN events, zone memberships, connectivity, storage faults, and the like. The term "attributes" refers to a subset of that larger body of information. Attributes are details that are particular to a type of object, such as a volume—details such as its size, version, identification tags, name and quality of service. Attributes may also include other relationships such as those between file systems, volumes, disk groups, LUNs, storage enclosures, disks and quality of service.

Explorers 206D may be categorized into various types, including switch explorers, zoning explorers, disk array explorers, volume explorers, file system explorers, and Host Bus Adapter (HBA) explorers. Volume and file system explorers are configured to discover volume and file system information, such as volume name, mount point, number of files present in the file system, total space, free space and used space. The management server explorer may use the Fiber Channel Common Transport (CT) protocol to communicate with switches in fabric 110. The management server explorer may, for example, discover switches in-band over Fiber Channel, obtain switch characteristics, and/or explore port connectivity. The management server explorer may optionally run over IP networks. For some switches, the management server explorer may run out-of-band. The management server explorer may also perform in-band zoning.

Zoning explorers are generally used as an interface for the SAN access layer 204 to communicate with fabric switches to perform discovery and control of zones in the SAN 100. When users issue zoning commands, the SAN access layer 204 use a zoning explorer to contact the switch to perform the zoning operation. As such, zoning explorers may communicate with the switches out-of-band. The zoning explorers may complete transactions with a switch management server to discover zone names and attributes and to perform switch zoning commands.

HBA explorers are generally used to discover information about SAN-connected storage devices 104 that are zoned to a host 102 that is running a SAN management server 250 or where a SAN access layer remote 230 (described below) resides. The HBA explorer interacts with a host 102 to discover HBAs and device paths. A device path is generally defined as a route through an interconnect that allows two or more devices to communicate. As such, an HBA explorer may not discover locally attached storage (e.g. disks or other devices attached through a SCSI or IDE controller). If these storage devices have OS handles, then the HBA explorer may return LUN names and attributes. An OS handle is typically used by the operating system to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Disk array explorers are generally used to provide information about array names and their attributes, such as number of ports and the number of disks contained in an array. Disk array explorers may also be used to discover disk arrays/enclosures and their LUNs. In doing so, disk array explorers pass LUN management commands to the array's management interface to execute. Disk array explorers may discover LUNs that are not masked to discovered hosts. The SAN access layer 204 may include disk array explorers specific to disk arrays of various vendors. Disk array explorers generally start when SAN access layer 204 starts. The disk array explorers also check to see if host 102B has a management interface. If host 102B does not have the management interface, the corresponding explorer may be disabled. If the management interfaces are present, the explorers may determine if the host 102B has access to any LUNs exported by the array. If any LUNs are available, the explorers may attempt to discover the array using the OS handle of the LUN. Further, some disk array explorers may use an out-of-band network protocol, such as SNMP, to communicate directly with the disk array controller. IP addresses for each disk array may be supplied for SAN access layer 204 discovery and communication. Additionally, the SAN access layer 204 may communicate with a disk array through the array's management interface. The array vendor's management software is generally installed on a host 102B with an in-band connection to the arrays to be managed. The management software provides a unified interface/command interpreter between the SAN management system and the arrays in the fabric.

FIG. 1 further illustrates host 102B having the SAN access layer remote 230 to assist the SAN management server 250 in discovering the entire SAN 100. The SAN access layer remote 230 includes one or more explorers 206E. Explorers 206E may include one or more explorers 206 that may also be used by SAN access layer 204, such as a management server explorer and an HBA explorer. Explorers 206E may also include an out-of-band switch explorer. The SAN access layer 204 and the SAN access layer remote 230 may each include a set of one or more explorers 206 that may be determined by the discovery requirements and/or contents of the region of the SAN visible to the host 102A-B on which SAN access layer 204 or the SAN access layer remote 230 resides. The SAN access layer remote 230 provides information gathered by explorers 206E to SAN access layer 204, which aggregates this information into SAN access layer 204 data store. The SAN management server 250 communicates with SAN access layer remote(s) 230 across an HTTP connection. The SAN management server 250 may use XML or other connections and communications protocols to communicate with SAN access layer remote(s) 230.

To get detailed information about a remote host 102B, the SAN access layer remote 230 is installed in the host 102B, and host 102B is added to a SAN access layer configuration file in the SAN management server 250. The host 102B running the SAN access layer remote 230 is generally specified as either a "Host" or an "In-Band Host" in the SAN access layer configuration file. The "Host" entry is used to define other hosts 102 attached to the SAN. The "In-Band Host" entry is used to define at least one SAN access layer remote host 102 per each SAN fabric 110 that is not attached to and thus not discovered by SAN management server 250.

The SAN management server 250 also includes the volume manager 205, which is a storage management subsystem that allows the user to manage physical disks as logical devices called volumes. A physical disk device is the basic storage device where data is ultimately stored, and a volume is a virtual disk device that appears to applications, databases, and file systems like a physical disk device. Each volume records and retrieves data from one or more physical disks. Due to its nature, a volume is not restricted to a particular disk or a specific area of a disk. Thus, volumes can be accessed by file systems, databases, or other applications in the same way that physical disks are accessed. The volumes created by the volume manager 205 look and act to the operating system like physical disks. Each volume is typically stored in a disk group, which is a collection of volumes that share a common configuration. In this manner, volumes are created within a disk group. A file system can be placed on the volume to organize the disk space with files and directories.

The volume manager 205 overcomes physical restrictions imposed by hardware disk devices by providing a logical volume management layer. This allows volumes to span multiple disks. The volume manager 205 typically operates as a subsystem between the operating system and the storage management system, such as a SAN-based, direct attached storage and other configurations of network attached storage, which includes storage components, including storage arrays, JBODs direct attached storage and the respective lower level components, such as disks, LUNs and other addressable unit elements. When one or more physical disks are brought under the control of the volume manager 205, the volume manager 205 creates virtual objects called volumes on those physical disks.

The SAN management server 250 further includes the automatic provisioning service 221, which is configured to automatically provision additional storage to entities, such as a raw partition, a storage volume, a file system and the like, in the event the available storage in the entity decreases below a predetermined amount. The automatic provisioning service 221 may also operate with other applications in provisioning the above referenced entities. The automatic provisioning service 221 may be a script-based action and an integrated program module compiled and linked as a component of the management system software or a standalone service that communicates with the management system software to provide a provisioning service. The automatic provisioning service 221 will be discussed in greater detail in the following paragraphs with reference to FIGS. 2A and 2B.

The SAN manager 202 generally serves as a central point for the user to perform one or more of SAN management tasks, including administering the SAN, viewing topographical displays of discovered objects in the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. Applications, such as a Web browser, may function as clients to SAN management server 250. More than one SAN manager 202 may connect simultaneously with SAN management server 250. Furthermore, the SAN 100 may include a command line interface that enables the user to query and modify SAN management server monitoring service objects, configuration settings and perform other related SAN management system tasks.

The SAN manager 202 may also serve as a central point from which a SAN administrator or other user may create and manage groups of SAN objects, including groups of heterogeneous components. As such, the SAN manager 202 provides a group utility for creating and managing logical groups of SAN. objects, including hosts 102A & B, storage device 104 interconnects, other groups, and other objects that may be members of a group. A group is defined as an arbitrary set of SAN elements defined by an administrator to help organize and provision resources, and is generally implemented by storage administrators to identify and manually provision available storage devices 104 that match the quality of service requirements of particular user groups or applications. The group utility is used to create logical storage groups where device membership may be based on zoning, LUN masking, hosts etc., and may also be based on the need for a collection of devices to be viewed as one entity for activities such as reporting, configuring and monitoring SAN resources.

Several types of groups exist, such as, generic groups, storage accounts, and storage groups. Furthermore, groups may be nested within other groups. Generic groups generally include switches, hosts 102, storage devices 104, and/or nested groups of any group type. Storage accounts generally include hosts 102, storage devices 104, and/or nested groups (storage accounts or storage groups only). A storage account generally includes one or more host objects and all the storage that the user assigns to them. Storage groups generally include storage devices 104 and/or nested groups (storage groups only). Storage groups may be used to categorize storage resources by quality of service criteria, including cost, performance, capacity, and location.

Figure 2A:
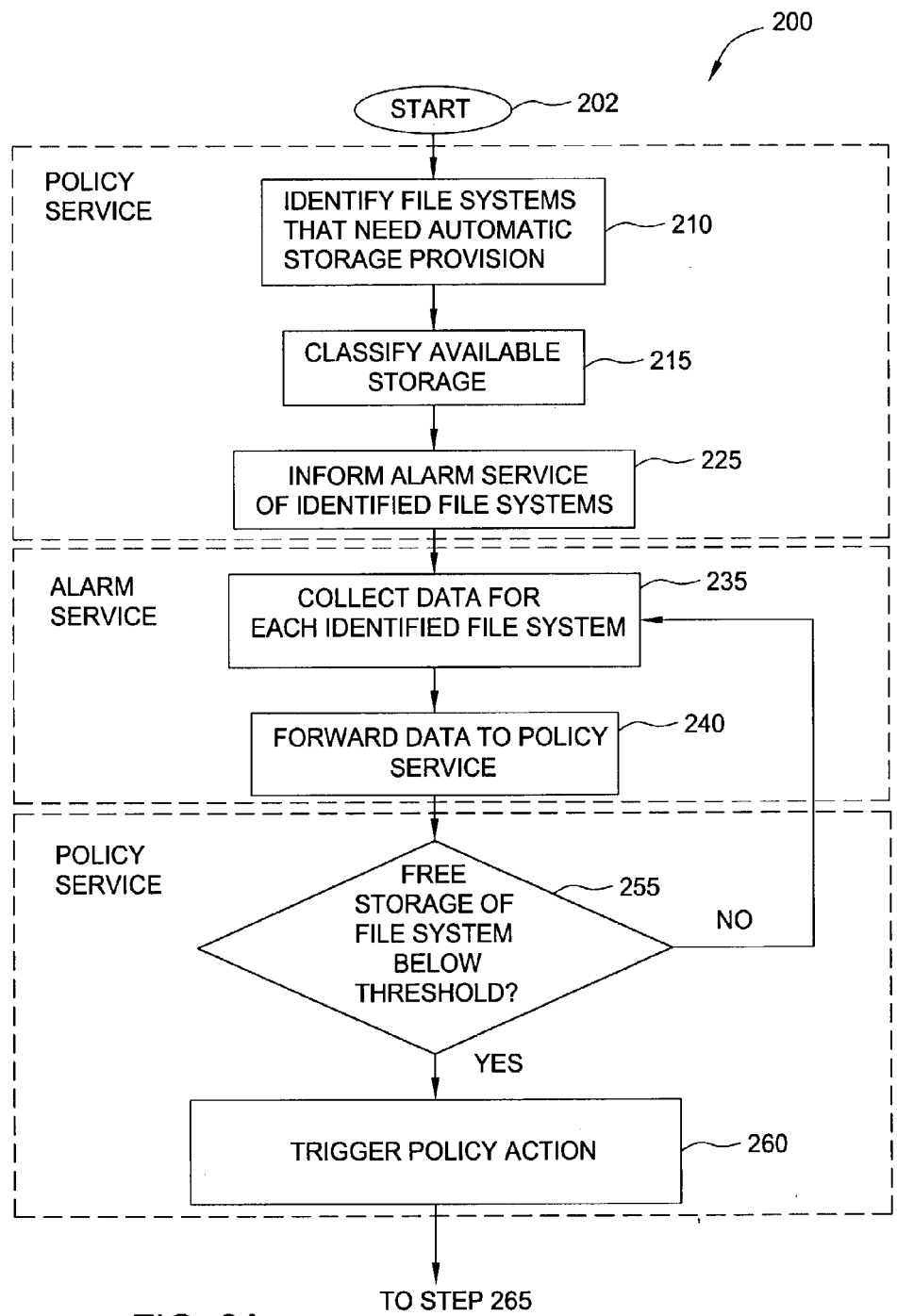
FIG. 2A and FIG. 2B illustrate a flow diagram of a method of monitoring and automatically provisioning storage to a file system in accordance with one embodiment of the invention.
Figure 2B:
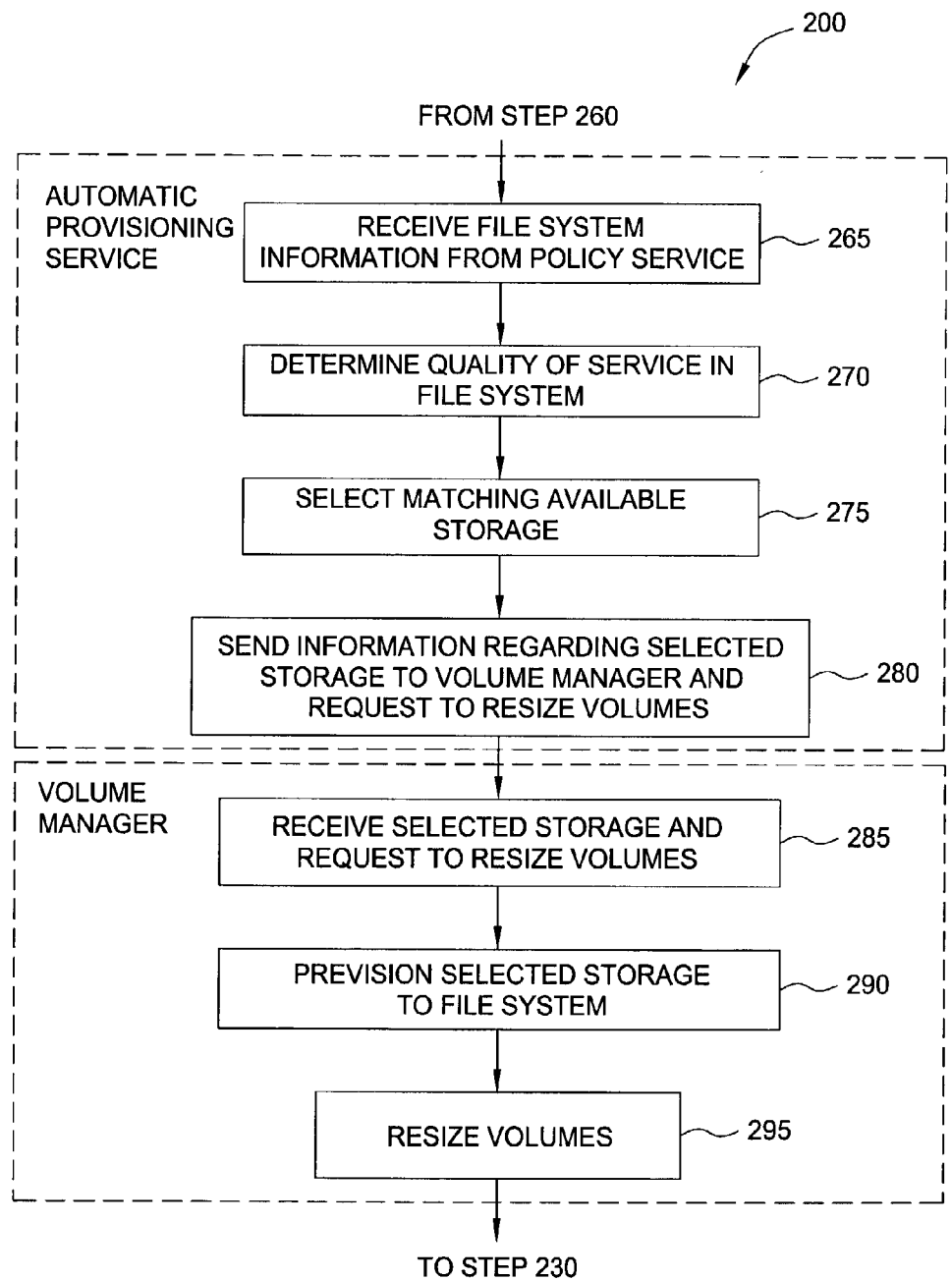

A detailed, description of the operation of the automatic provisioning service 221 will now be described in the following paragraphs. FIG. 2A and FIG. 2B illustrate a flow diagram of a method 200 of monitoring and automatically provisioning storage to a file system in accordance with one embodiment of the invention. The method 200 starts at step 210 where the policy service 220 identifies one or more file systems in host 102B (or other remote hosts connected to host 102A) whose storage needs to be automatically provisioned. In one embodiment, the policy service contacts the SAN access layer remote 230 to gather information regarding the file systems in host 102B. Such information may include the applications running on host 102B, the files used by the applications, the file systems containing those files, the volumes containing the file systems, the addressable units or logical unit numbers (LUNs) making up the disk group that contain the volumes, and the physical disks that comprise the addressable units. Upon receiving this information from the SAN access layer remote 230, the policy service 220 identifies the file systems that are of interest to the user, as defined by the policies. For instance, the user may want to automatically provision only the storage of file systems used by Oracle servers. Or, the user may want to automatically provision only the storage of file systems created by certain applications running on host 102B. Once the file systems of interest to the user have been identified, the policy service 220 stores the names of those file systems in a group specifically designated for automatic provisioning. This group may be stored in the database 226. In this manner, the policy service 220 categorizes the file systems whose storage will be automatically provisioned and the file systems whose storage will not be automatically provisioned.

At step 215, once the file systems that are of interest to the user have been identified, the policy service 220 now identifies available storage in the SAN 100 that can be used to automatically provision the file systems of interest. That is, the policy service 220 determines which available storage devices 104 match the quality of service requirements of the storage currently being used by the file systems of interest. The quality of service requirements may include a specific RAID level, disk vendor, enclosure location, redundancy, cost of storage, etc. In this manner, the policy service 220 classifies the matching available storage devices 104 into different quality of service groups and reserves the matching available storage for use by the automatic provisioning service 221. Once the matching available storage devices have been identified, they are stored in the database 226. Alternatively, the user may manually assign the available storage devices 104 into the various quality of service groups.

At step 225, once the matching available storage devices 104 have been classified into various quality of service groups, the policy service 220 sends information uniquely identifying the file systems of interest and a message to the monitoring service 222 to indicate to the monitoring service 222 to start monitoring status and performance information regarding the file systems of interest. At step 235, the monitoring service 222 begins to collect status and performance information (attribute information) regarding the file systems of interest, and more particularly, the amount of available storage in the file systems of interest. The amount of available storage monitored may be in the form of percentage of free space or number of bytes free, for example. The amount of available storage may also be in the form of blocks of LUNs used by the volume that have not been used in a volume resize operation. For instance, the user may wish to add more LUNs to a volume when the number of free LUNs associated with the volume is below a predetermined count. The amount of available storage may be collected periodically, e.g., every 5 minutes. At step 240, the monitoring service 222 forwards the amount of available storage to the policy service 220.

At step 255, upon receiving the amount of available storage from the monitoring service 222, the policy service 220 determines whether the amount of available storage has met a threshold condition, i.e., decreases below a predetermined amount. In one embodiment, the threshold condition is whether the amount of available storage has decreased below 3% of free bytes. If the threshold condition has been met, then the policy service 220 triggers a policy action, which sends the information identifying the file system whose available storage has met the threshold condition to the automatic provisioning service 221, thereby launching the automatic provisioning service 221 (step 260). The policy action may also include displaying a notification message on a management console or sending a notification via email or Instant Messaging to the user to indicate that the threshold condition has been met and that the named file system will be automatically provisioned. If the threshold condition has not been met, the method 200 returns to step 235 at which the monitoring service 222 continues to monitor the amount of available storage in the file systems of interest. One policy may be created for each attribute information.

Upon receiving the name of the file system to be provisioned (step 265), the automatic provisioning service 221 accesses the database 226 and determines the quality of service requirements for the storage currently being used in the file system (step 270). At step 275, the automatic provisioning service 221 selects one or more available storage entities from a quality of service group, which was previously classified by the policy service 220 at step 215, that matches the quality of service requirements of the storage currently being used in the file system. After the matching available storage has been selected from the quality of service group, information, e.g., the name, identifying the selected storage is deleted to prevent the selected storage from being used by future provisioning operations. On the other hand, if no available storage from the quality of service groups matches, then the automatic provisioning service 221 notifies the user of the condition. In one embodiment, following step 265, the automatic provisioning service 221 determines whether the volume associated with the file system to be provisioned has exceeded its maximum limit. If so, the automatic provisioning service 221 notifies the user of the condition and the method 200 returns to step 235, as previously described. In one embodiment after step 275, the automatic provisioning service 221 may apply the proper security measures, such as zoning and LUN masking, to the selected available storage to match the security measures of the storage currently used in the file system.

Zoning and LUN masking will now be briefly described in connection with embodiments of the invention. Zoning is a security mechanism that is utilized to control access between participants in a SAN fabric. By creating and managing zones, the user may control host access to storage resources. The access restrictions created by zones in the SAN are enforced by a number of methods. These methods include soft zoning and hard zoning. Soft zoning, also called advisory zoning, is enforced simply by filtering the visibility of objects in the SAN so that an object can only see other objects that share at least one zone membership with the object. In hard zoning, a Fiber Channel switch actively blocks access to zone members from any objects outside the zone. This is performed at the level of ports on the switch. Hard zoning may also be referred to as switch port zoning. Objects in the SAN typically include switch ports, host 102B, and storage devices 104.

Some zoning methods support switch zoning through application program interfaces (APIs) provided by switch vendors, allowing for both hard and soft zoning. As such, the SAN manager 202 serves as a centralized point from which a user may access SAN management system and/or third-party services, tools, applications, and/or utilities to create and manage zones in the SAN, including zones containing heterogeneous SAN objects. Currently, no industry-wide standard exists for zoning, and different vendors' switches may implement switch zoning in different ways. Consequently, one method may use a switch-neutral approach to zoning. Another may provide a zone utility that facilitates the creation, modification, and deletion of zones. The zone utility provides storage zone definition, creation and management. The zone utility is used to administer zones directly and visually, thereby reducing or removing the need to use telnet commands or proprietary, hardware-specific Web-based solutions. The zone utility may also automatically filter the list of objects in the SAN and present a list of objects that are available to be added to a zone.

A LUN (logical unit number) is the SCSI (Small Computer System Interface) identifier of a logical unit within a target, which is the system component that receives a SCSI I/O command. A logical unit is an entity within a SCSI target that executes I/O commands. SCSI I/O commands are sent to a target and are executed by a logical unit within that target. A SCSI physical disk typically has a single logical unit. Tape drives and array controllers may incorporate multiple logical units to which I/O commands can be addressed.

LUN security is the collective name given to the operations involved in making storage devices 104 available to host 102B on a SAN, and may include LUN locating or searching, LUN binding, LUN masking, and fabric zoning. LUN security provides granular control over host 102B access to individual LUNs within an array or other collection of potentially heterogeneous storage devices.

A LUN security utility may also be provided to serve as a central point from which to perform LUN security operations, including LUN binding (the creation of access paths (LUNs) between Addressable Units within a disk array and ports on the array), LUN masking (enabling access to Addressable Units for host HBA ports), and fabric zoning (allowing the host to see the AU and create an Operating System (OS) handle for it). The LUN security utility may be provided through the SAN manager 202. The LUN security utility guides the user through configuring LUN security operations and allows the user to execute the configured LUN security operations with a single operation, for example, a single click of a button in the user interface. LUN security operations configured and initiated using the LUN security utility are viewed as transactions. A transaction is defined as a sequence of information exchange and related work that is treated as a unit for purposes of satisfying a request and for ensuring data integrity. For a transaction to be completed and changes to be made permanent, a transaction has to be completed in its entirety.

A LUN query tool may also be provided to search for and find LUNs on the SAN that match one or more properties, such as device vendor, storage type, capacity, configuration, cost, and location. The LUN query tool returns a list of all LUNs that meet those requirements. The LUN query tool may be launched in context from another utility such as a zone utility or a LUN security utility.

Referring back to the method 200, after the automatic provisioning service 221 applies the proper zoning and LUN masking configuration to the matching available storage, the automatic provisioning service 221 forwards information identifying the matching available storage to the volume manager 205 and request the volume manager 205 to provision the matching available storage to the file system of interest and resize the volumes associated with the file system to accommodate the provision of available storage, at step 280.

At step 285, the volume manager 205 receives the information identifying the available storage from the automatic provisioning service 221. At step 290, the volume manager 205 provisions the matching available storage in the storage devices 104 to the volumes associated with the file system and at step 295, resize the volumes to accommodate the newly provisioned matching available storage. Processing then returns to step 235 at which the monitoring service 222 continues to monitor the amount of available storage in the file systems of interest. After the volume manager 205 assigns the additional storage to the file system that needed provisioning, the status of the available storage for that file system returns to a "clear state", since the additional storage causes the policy to no longer meet the threshold condition. In the event that the volume manager 205 does not have an automatic resizing feature, the automatic provisioning service 221 notifies the user of the condition and urges the user to manually resize the volumes.

While the foregoing is directed to embodiments of the present invention, other and further embodiments of the invention may be devised without departing from the basic scope thereof, and the scope thereof is determined by the claims that follow.

The invention claimed is:

1. A system comprising:
   a plurality of storage devices;
   a storage area network (SAN) fabric comprising a plurality of fabric components for coupling one or more remote systems to the storage devices; and
   a central system having a SAN management server configured to
      identify a file system for which storage is to be automatically provisioned, wherein
         the one or more remote systems comprise the file system,
      identify available device storage, wherein
         the available device storage is storage in the plurality of storage devices that is available to be used by the file system,
      monitor an amount of available storage in the file system, and
      in the event the amount of available storage in the file system decreases below a predetermined amount, automatically provision additional storage to the file system, wherein
         the automatic provisioning of additional storage comprises
            selecting one or more available storage entities, wherein
               the available device storage comprises a plurality of available storage entities,
               the selecting comprises selecting the one or more available storage entities from the plurality of available storage entities, and
               the one or more available storage entities match storage used by the file system in at least one quality of service attribute among a set of quality of service attributes, and
            applying a new security measure to the additional storage, wherein
               the new security measure matches a security measure of the storage used by the file system.

2. The system of claim 1, wherein the SAN management server comprises a monitoring service configured to:
    determine the amount of available storage in the file system, and
    forward the amount of available storage in the file system to a policy service.

3. The system of claim 1, wherein the SAN management server comprises a policy service configured to:
    determine whether the amount of available storage decreases below the predetermined amount, and
    trigger a policy action when the amount of the available storage decreases below the predetermined amount, wherein
        the policy action comprises at least one of
            sending a message indicating that the amount of the available storage in the file system has decreased below the predetermined amount, or
            sending information identifying the file system to an automatic provisioning service.

4. The system of claim 1, wherein the SAN management server comprises an automatic provisioning service configured to:
    determine the at least one quality of service attribute of the storage used by the file system, and
    select the one or more available storage entities based at least in part on the at least one quality of service attribute.

5. The system of claim 4, wherein the SAN management server comprises a volume manager configured to:
    provision the additional storage to the file system, and
    resize volumes associated with the file system to accommodate the provision of the additional storage.

6. The system of claim 1, wherein the SAN management server is further configured to:
    select the one or more available storage entities based at least in part on the at least one quality of service attribute, and
    resize volumes associated with the file system based at least in part on the additional storage.

7. The system of claim 1, wherein the SAN management server is further configured to:
    select the one or more available storage entities based at least in part on a RAID level of the additional storage matching a RAID level of the file system.

8. The system of claim 1, wherein the SAN management server is further configured to:
    select the one or more available storage entities based at least in part on
        a redundancy attribute of the additional storage matching a redundancy attribute of the file system, and
        a performance attribute of the additional storage matching a performance attribute of the file system, and
    resize volumes associated with the file system based at least in part on the additional storage.

9. The system of claim 1, wherein
the set of quality of service attributes comprises at least one of
    a RAID level attribute,
    a disk vendor attribute,
    an enclosure location attribute,
    a redundancy attribute,
    a performance attribute, or
    a cost of storage attribute.

10. A system, comprising:
a processor; and
a memory comprising program instructions, wherein the program instructions are executable by the processor to
    identify a file system for which storage is to be automatically provisioned, wherein
        one or more remote systems comprise the file system, and
        the one or more remote systems are coupled to a plurality of storage devices,
    identify available device storage, wherein
        the available device storage is storage in the plurality of storage devices that is available to be used by the file system,
    monitor an amount of available storage in the file system, and
    in the event the amount of available storage in the file system decreases below a predetermined amount, automatically provision additional storage to the file system, wherein
        the automatic provisioning of additional storage comprises
            selecting one or more available storage entities, wherein
                the available device storage comprises a plurality of available storage entities,
                the selecting comprises selecting the one or more available storage entities from the plurality of available storage entities, and
                the one or more available storage entities match storage used by the file system in at least one quality of service attribute among a set of quality of service attributes, and
            applying a new security measure to the additional storage, wherein
                the new security measure matches a security measure of the storage used by the file system.

11. The system of claim 10, wherein the program instructions are executable by the processor to:
    identify that the additional storage matches the storage used by the file system in the at least one quality of service attribute.

12. The system of claim 11, wherein the program instructions are executable by the processor to:
    determine the at least one quality of service attribute of the storage used by the file system, and
    select the one or more available storage entities.

13. The system of claim 12, wherein the program instructions are executable by the processor to:
    provision the additional storage to the file system, and
    resize volumes associated with the file system to accommodate the provision of the additional storage.

14. The system of claim 10, wherein the program instructions are executable by the processor to:
    determine the amount of available storage in the file system.

15. The system of claim 10, wherein the program instructions are executable by the processor to:
    determine whether the amount of available storage decreases below the predetermined amount, and
    trigger a policy action when the amount of the available storage decreases below the predetermined amount.

16. The system of claim 10, wherein
the set of quality of service attributes comprises at least one of
    a RAID level attribute,
    a disk vendor attribute,
    an enclosure location attribute,
    a redundancy attribute,
    a performance attribute, or
    a cost of storage attribute.

17. A method of provisioning storage to a file system, comprising:
- identifying a file system for which storage is to be automatically provisioned, wherein
  - one or more remote systems comprise the file system, and
  - the one or more remote systems are coupled to a plurality of storage devices;
- identifying available device storage, wherein
  - the available device storage is storage in the plurality of storage devices that is available to be used by the file system;
- determining an amount of available storage in the file system;
- determining whether the amount of available storage decreases below a predetermined amount; and
- if the amount of the available storage decreases below the predetermined amount, automatically provisioning the file system with additional storage, wherein
  - the automatic provisioning of additional storage comprises
    - selecting one or more available storage entities, wherein
      - the available device storage comprises a plurality of available storage entities,
      - the selecting comprises selecting the one or more available storage entities from the plurality of available storage entities, and
      - the one or more available storage entities match storage used by the file system in at least one quality of service attribute among a set of quality of service attributes, and
    - applying a new security measure to the additional storage, wherein
      - the new security measure matches a security measure of the storage used by the file system.

18. The method of claim 17, wherein the determining the amount of available storage in the file system comprises:
- reserving the additional storage.

19. The method of claim 17, wherein the automatically provisioning the file system with additional storage comprises:
- determining the at least one quality of service attribute of the storage used by the file system; and
- selecting the one or more available storage entities.

20. The method of claim 17, comprising:
- resizing one or more volumes associated with the file system, wherein
  - the resizing is performed after the automatically provisioning the file system with the additional storage.

21. The method of claim 17, wherein
the set of quality of service attributes comprises at least one of
- a RAID level attribute,
- a disk vendor attribute,
- an enclosure location attribute,
- a redundancy attribute,
- a performance attribute, or
- a cost of storage attribute.

22. An apparatus for automatically provisioning storage to a file system, comprising:
- means for identifying a file system for which storage is to be automatically provisioned, wherein
  - one or more remote systems comprise the file system, and
  - the one or more remote systems are coupled to a plurality of storage devices in a storage area network (SAN);
- means for identifying available device storage, wherein
  - the available device storage is storage in the plurality of storage devices that is available to be used by the file system;
- means for determining an amount of available storage in the file system;
- means for determining whether the amount of available storage decreases below a predetermined amount; and
- means for, if the amount of the available storage decreases below the predetermined amount, automatically provisioning the file system with additional storage, wherein
  - the automatic provisioning of additional storage comprises
    - selecting one or more available storage entities, wherein
      - the available device storage comprises a plurality of available storage entities,
      - the selecting comprises selecting the one or more available storage entities from the plurality of available storage entities, and
      - the one or more available storage entities match storage used by the file system in at least one quality of service attribute among a set of quality of service attributes, and
    - applying a new security measure to the additional storage, wherein
      - the new security measure matches a security measure of the storage used by the file system.

23. The apparatus of claim 22, wherein
the set of quality of service attributes comprises at least one of
- a RAID level attribute,
- a disk vendor attribute,
- an enclosure location attribute,
- a redundancy attribute,
- a performance attribute, or
- a cost of storage attribute.

* * * * *